United States Patent
Steely, Jr. et al.

(10) Patent No.: US 6,493,801 B2
(45) Date of Patent: Dec. 10, 2002

(54) ADAPTIVE DIRTY-BLOCK PURGING

(75) Inventors: Simon C. Steely, Jr., Hudson, NH (US); Nikolaos Hardavellas, Belmont, MA (US)

(73) Assignee: Compaq Computer Corporation, Houston, TX (US)

(*) Notice: Subject to any disclaimer, the term of this patent is extended or adjusted under 35 U.S.C. 154(b) by 156 days.

(21) Appl. No.: 09/771,098

(22) Filed: Jan. 26, 2001

(65) Prior Publication Data

US 2002/0103976 A1 Aug. 1, 2002

(51) Int. Cl.[7] .............................................. G06F 12/00
(52) U.S. Cl. ..................... 711/135; 711/133; 711/134; 711/136; 711/137; 711/159; 711/160
(58) Field of Search ................................ 711/133, 135, 711/137, 134, 136, 159–160

(56) References Cited

U.S. PATENT DOCUMENTS

| | | | | |
|---|---|---|---|---|
| 3,577,185 A | * | 5/1971 | Belady | 711/159 |
| 5,819,033 A | * | 10/1998 | Caccavale | 709/224 |
| 5,974,507 A | * | 10/1999 | Arimilli et al. | 711/133 |
| 6,122,714 A | | 9/2000 | VanDoren et al. | |
| 6,163,773 A | * | 12/2000 | Kishi | 706/16 |
| 6,189,078 B1 | * | 2/2001 | Bauman et al. | 711/156 |
| 6,266,742 B1 | * | 7/2001 | Challenger et al. | 711/133 |
| 6,272,598 B1 | * | 8/2001 | Arlitt et al. | 711/133 |

OTHER PUBLICATIONS

Lebeck, Alvin R. and Wood, David A., Dynamic Self-Invalidation: Reducing Coherence Overhead in Shared-Memory Multiprocessors, (c) 1995.

* cited by examiner

Primary Examiner—Do Hyun Yoo
Assistant Examiner—Mehdi Namazi
(74) Attorney, Agent, or Firm—Cesari and McKenna, LLP; Edwin H. Paul, Esq.

(57) ABSTRACT

An adaptive cache coherent purging protocol includes recognizing system performance, especially latency, is affected by when cache is purged. The occurrence of performance enhancing and degrading events regarding a cache are counted and compared to a threshold. When the threshold is triggered the cache becomes a candidate for purging. In an embodiment, a time out delay is implemented before actual purging occurs. When the threshold is not triggered but a cache event occurs, a fake time out delay is triggered and the count is adaptively either raised, lowered or set to zero in response to performance enhancing and/or degrading events. The effect is to make the actual purging more likely if the history of cache events indicates that the performance would be enhanced thereby or less likely if the history indicates that the performance would be degraded thereby.

22 Claims, 7 Drawing Sheets

ADAPTIVE DIRTY-BLOCK PURGING

BACKGROUND OF THE INVENTION

1. Field of the Invention

The present invention relates generally to modular multiprocessor computing systems and, in particular to coherent cache control in such systems, and even more particularly to controlling the purging of cache memories to enhance the system's performance.

2. Background Information

Modular multiprocessor computing systems typically have a number of multiprocessor nodes interconnected via switching fabric. Each node includes multiple processors, memory arrays, and input/output access hardware, and the interconnecting switching mechanisms. Cache memory, also referred to as "cache," is routinely found in these system.

These modular multiprocessor systems share many resources including memory. However, in such large systems, cache is usually associated with a particular processor and holds the data that that processor is likely to access in the near future. However, input/output ports may also have such private caches. In these large systems the processor and/or the input/output ports may update the contents of their private caches without updating shared memory, and a cache coherent protocol is often utilized to maintain data consistency and accuracy of the data. In such systems the control of the cache becomes more complex, and more particularly the decisions of when to purge or not to purge cached data to memory can significantly affect the efficiency and/or speed of the entire processing system.

In some systems the organization of the cache is in blocks, lines or clusters of lines. The data stored in a cache is exclusive to one owner, where that owner has direct control of the data. In operation a data segment ownership may be claimed by a processor with an up-to-date copy of the data by executing a change-to-dirty (XTD or CTD) operation which grants ownership of the data cache block to the processor. In this context a "dirty" state of data denotes the unique most up-to-date copy of the data in the system. Upon obtaining ownership, invalidations are sent to all other copies in the system. That owner may then change the contents of the data. This occurrence presents a performance issue for multiprocessor systems that is being addressed by this invention. The issue may be stated in question form as when, from improving the system's performance point of view, should the modified data be purged from the cache to shared memory from which any processor can access that up-to-date data. In particular latency (the time it takes to access data or information) is the system performance parameter being improved by the present invention but other such performance parameters may be improved by advantageous use of the present invention.

If a processor needs to access data it is most efficient to have the data stored in its local cache, but if a remote processor needs to access that same data, it would be efficient to have the local processor purge the up-to-date data to shared memory from which the remote processor can access it. If not purged the remote processor must find in which cache the data resides before obtaining it.

Some shared memory multiprocessor systems send updates to memory as changes occur (commonly referred to as "write-through" cache). Clearly this is an inefficient slowing of the entire processing system due to the large number of messages sent.

Cache purging control has evolved to the point that the data remains in the owned cache until the owner needs the space for another data segment. At that time the cache contents are "victimized" to shared memory. This has the undesirable effect of leaving the data in the cache so that it takes a long time (latency) for a remote processor to read the data. This is called a read-dirty (rddirty) event or operation. This is inefficient because the read operation must go to the memory to find the data segment is not there, then to another processor, and then return to the original requesting processor—three hop process. If the data segment had been purged to. shared memory, the read operation would entail a miss in a remote cache followed by a load directly from the shared memory—a two hop process. However, if the data segment were needed to be subsequently updated by the local owner processor, purging the data segment would cause the processor to regain ownership (called a change-to-dirty) and therefore slow down the system. If the owner processor had no need to subsequently update the data segment, then it is clear that replacing a three hop with a two hop process would increase the speed and thus the efficiency of such a system. The present invention is directed to resolving this dilemma in an adaptive manner that preserves a balance between. purging and not purging cache segments that enhances system performance.

SUMMARY OF THE INVENTION

The limitations of the prior art and objects and advantages of the present invention are employed in a self adapting system and method for determining and purging cache candidates.

The present invention tracks and counts events on local cache data by a local processor and by remote processors. In preferred embodiments the cache data may be characterized as the entire data segment, a line of bytes or a cluster of lines or a block—any amount of data may be purged or not purged advantageously using the present invention. The present invention recognizes that the system performance is enhanced when the local processor accesses its local cache (by write or read hits) memory, and that system performance is degraded if the local cache data was purged to memory whereupon the local processor must regain ownership of the local cache data from that same memory using a change-to-dirty operation. Similarly, if the local cache data is purged, system performance is enhanced when a remote miss allows the remote processor to load the data directly from memory without having to access the local processor; but the system performance is degraded when the remote processor must execute a read-dirty from the local processor cache. The local cache data adaptively becomes a candidate for purging or is purged or not purged depending upon the history, tracking and comparing of these performance enhancing and degrading events as described in the present invention.

In some systems the present invention uses the eviction of cache data from one cache level or another as a trigger to cause the block to be purged. Such cache levels are known to practitioners in the art.

In a further aspect of the invention a threshold may be formed against which the comparing of the enhancing and degrading events are counted. A count total that meets or exceeds the threshold, herein defined as triggering the threshold, causes the cache segment to become a candidate for purging. However, if a degrading event occurs after the purging actually occurs but before an enhancing events occurs or a write-hit occurs after a fake time out occurs, the count may be reset to zero and the cache data ceases to be a candidate for purging and the counting begins anew. A fake time out is triggered when a degrading event occurs but the threshold is not triggered.

Read dirty means that a remote processor must access a local processor's cache. Change to dirty means that a local processor which has a copy of the data, but not ownership of the data, wants to write the data and needs to obtain ownership of the data. Remote miss means that the remote processor loads from memory. Victim means that the local processor stores cache data to memory. Purge means that the local processor stores cached data to memory, but keeps a read-only copy in its cache.

In another example, the threshold count value may be determined heuristically or calculated from the known characteristics of the system. Of course the threshold may be changed in an adaptive manner as described herein for the counter and/or to suit particular conditions.

In yet another example, a time out delay may be employed after the threshold is triggered. Here the local cache is purged after the time out expires. In one instance the delay may embody counting read-dirties or misses on the local cache, or counting clock cycles or virtually any other timing standard.

Also, the present invention encompasses cases where the local cache includes blocks, individually addressed cache lines, preferably of sixty-four bytes, and/or clusters of cache lines.

BRIEF DESCRIPTION OF THE DRAWINGS

The above and further advantages of the invention may be better understood by referring to the following description in conjunction with the accompanying drawings, in which like reference numbers indicate identical or functionally similar elements.

DETAILED DESCRIPTION OF AN ILLUSTRATIVE EMBODIMENT

Figure 1:
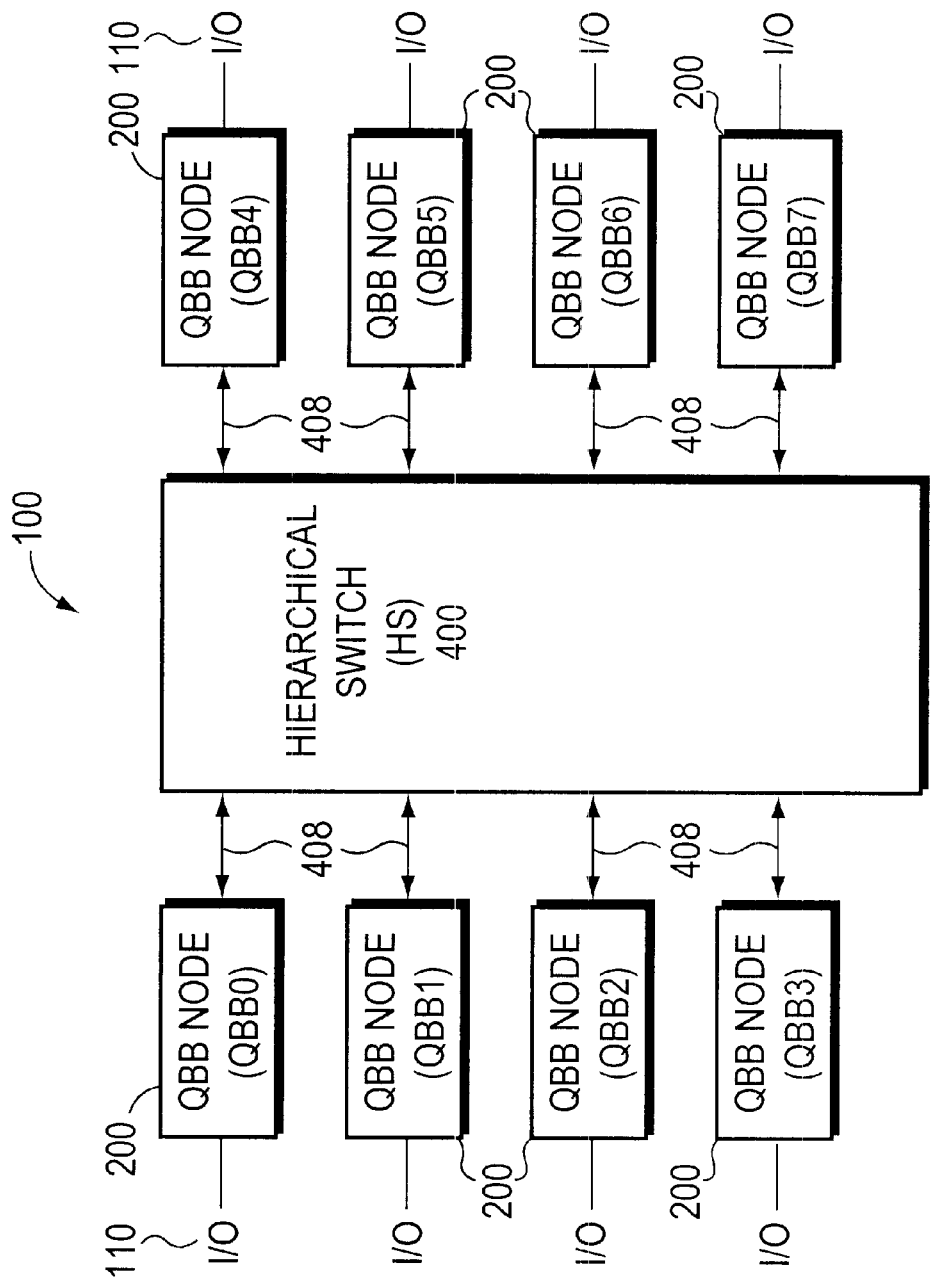
FIG. 1 is a schematic block diagram of a modular, symmetric multiprocessing (SMP) system having a plurality of Quad Building Block (QBB) nodes interconnected by a hierarchical switch (HS)

FIG. 1 is a schematic block diagram of a modular, symmetric multiprocessing (SMP) system 100 having eight nodes 200 interconnected by a hierarchical switch (HS 400). The SMP system further includes an input/output (I/O) subsystem ports 110. In a preferred embodiment the I/O ports 110 connect to external devices operating, in a preferred embodiment, under Peripheral Computer Interconnect (PCI) protocols.

In the illustrative embodiment, each node 200 is implemented as a Quad Building Block (QBB) node 200 comprising a plurality of processors, a plurality of memory modules, an I/O port (IOP) and a global port (GP) interconnected by a local switch. Each memory module may be shared among the processors of a node and, further, among the processors of other QBB nodes configured on the SMP system. A fully configured SMP system preferably comprises eight (8) QBB (QBB0-7) nodes, each of which is coupled to the HS 400 by a full-duplex, bi-directional, clock forwarded link 408.

Data is transferred between the QBB nodes of the system in the form of packets. In order to provide a distributed shared memory environment, each QBB node is configured with an address space and a directory for that address space. The address space is generally divided into memory address space and I/O address space. The processors and IOP of each QBB node utilize private caches to store data for memory-space addresses; I/O space data is generally not "cached" in the private caches.

Figure 2:
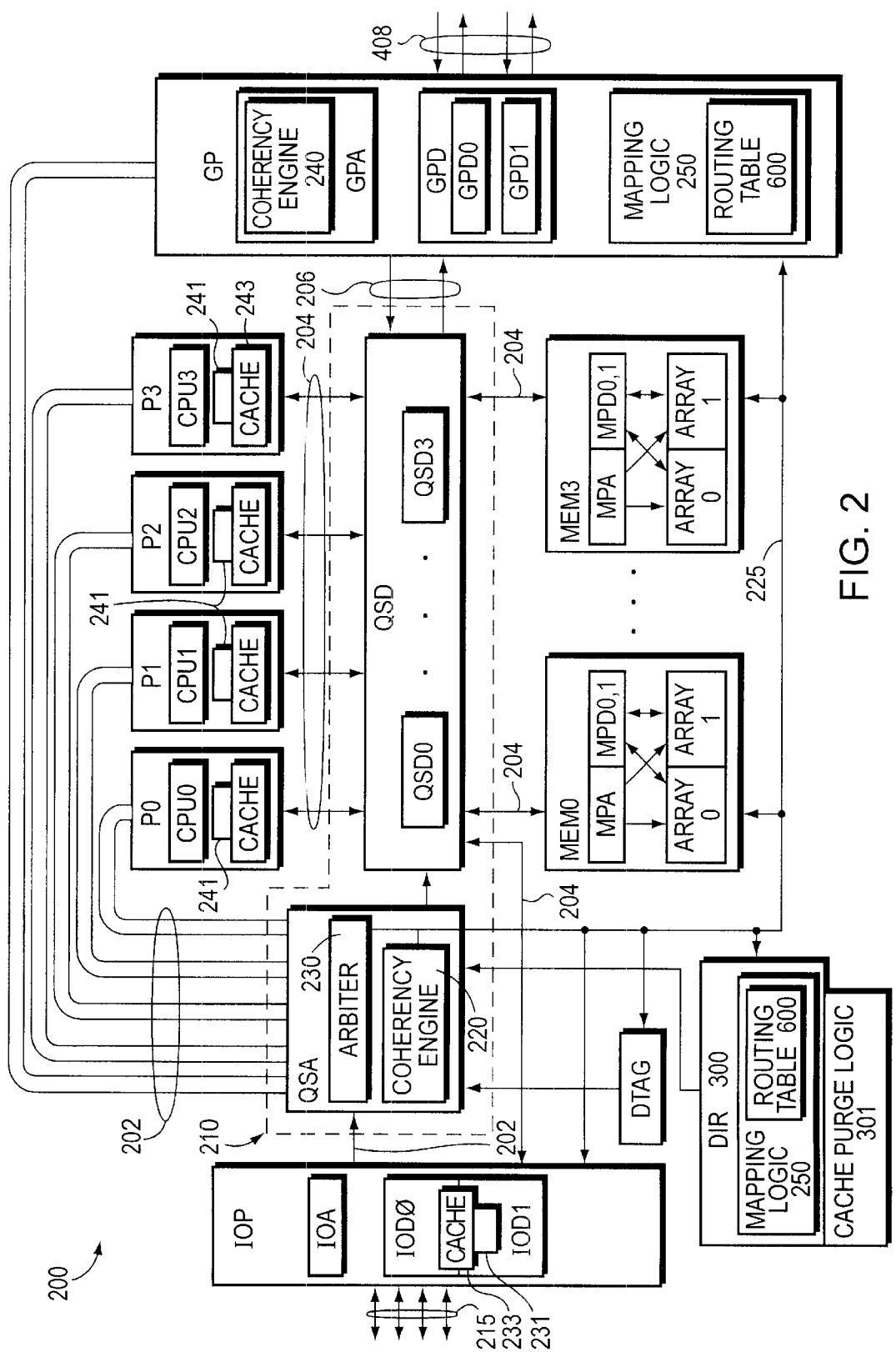
FIG. 2 is a schematic block diagram of a QBB node, including a directory (DIR) and mapping logic, coupled to the SMP system of FIG. 1.

FIG. 2 is a schematic block diagram of a QBB node 200 comprising a plurality of processors (P0–P3) coupled to the IOP, the GP and a plurality of memory modules (MEM0-3) by a local switch 210. The memory may be organized as a single address space that is shared by the processors and apportioned into a number of blocks, each of which may include, e.g., 64 bytes of data. The IOP controls the transfer of data between I/O devices and the QBB node via the I/O connections 110. As with the case of the SMP system, data is transferred among the components or "agents" of the QBB node in the form of packets. As used herein, the term "system" refers to all components of the QBB node.

Each processor is a modern processor comprising a central processing unit (CPU) that preferably incorporates a traditional reduced instruction set computer (RISC) load/store architecture. In the illustrative embodiment described herein, the CPUs are Alpha® 21264 processor chips manufactured by Compaq Computer Corporation®, although other types of processor chips may be advantageously used. The load/store instructions executed by the processors are issued to the system as memory references, e.g., read and write operations. Each operation may comprise a series of commands (or command packets) that are exchanged between the processors and the system.

In addition, each processor and IOP employs a private cache, 243 and 233 respectively, for storing data determined likely to be accessed in the future. The caches are preferably organized as write-back caches apportioned into, e.g., 64-byte cache lines accessible by the processors. It should be further noted that memory reference operations issued by the processors are preferably directed to a 64-byte cache line granularity. Since the IOP and processors may update data in their private caches without updating shared memory, a cache coherence protocol is utilized to maintain data consistency among the caches. Cache purge adaptive controllers, 231 and 241 are built into the caches 233 and 243; respectively.

The commands described herein are defined by the Alpha® memory system interface and may be classified into three types: requests, probes, and responses. Requests are commands that are issued by a processor when, as a result of executing a load or store instruction, it must obtain a copy of data. Requests are also used to gain exclusive ownership to a data item (cache line) from the system. Requests include Read (Rd) commands, Read/Modify (RdMod) commands, Change-to-Dirty (CTD) commands, Victim commands, and Evict commands, the latter of which specify removal of a cache line from a respective cache.

Probes are commands issued by the system to one or more processors requesting data and/or cache tag status updates. Probes include Forwarded Read (Frd) commands, Forwarded Read Modify (FRdMod) commands and Invalidate (Inval) commands. When a processor P issues a request to the system, the system may issue one or more probes (via probe packets) to other processors. For example if P requests a copy of a cache line (a Rd request), the system sends a Frd probe to the owner processor (if any). If P requests exclusive ownership of a cache line (a CTD request), the system sends Inval probes to one or more processors having copies of the cache line.

Moreover, if P requests both a copy of the cache line as well as exclusive ownership of the cache line (a RdMod request) the system sends a FRdMod probe to a processor currently storing a "dirty" copy of a cache line of data. In this context, a dirty copy of a cache line represents the unique most up-to-date version of the corresponding cache line or data block. In response to the FRdMod probe, the dirty copy of the cache line is returned to the system. A FRdMod probe is also issued by the system to a processor storing a dirty copy of a cache line. In response to the FRdMod probe, the dirty cache line is returned to the system and the dirty copy stored in the cache is invalidated. An Inval probe may be issued by the system to a processor storing a copy of the cache line in its cache when the cache line is to be updated by another processor.

Responses are commands from the system to processors and/or the IOP that carry the data requested by the processor or an acknowledgment corresponding to a request. For Rd and RdMod requests, the responses are Fill and FillMod responses, respectively, each of which carries the requested data. For a CTD request, the response is a CTD-Success (Ack) or CTD-Failure (Nack) response, indicating success or failure of the CTD, whereas for a Victim request, the response is a Victim-Release response.

Unlike a computer network environment, the SMP system 100 is bounded in the sense that the processor and memory agents are interconnected by the HS 400 to provide a tightly-coupled, distributed shared memory, cache-coherent SMP system. In a typical network, cache blocks are not coherently maintained between source and destination processors. Yet, the data blocks residing in the cache of each processor of the SMP system are coherently maintained. Furthermore, the SMP system may be configured as a single cache-coherent address space or it may be partitioned into a plurality of hard partitions, wherein each hard partition is configured as a single, cache-coherent address space.

Moreover, routing of packets in the distributed, shared memory cache-coherent SMP system is performed across the HS 400 based on address spaces of the nodes in the system. That is, the memory address space of the SMP system 100 is divided among the memories of all QBB nodes 200 coupled to the HS. Accordingly, a mapping relation exists between an address location and a memory of a QBB node that enables proper routing of a packet over the HS 400. For example, assume a processor of QBB0 issues a memory reference command packet to an address located in the memory of another QBB node. Prior to issuing the packet, the processor determines which QBB node has the requested address location in its memory address space so that the reference can be properly routed over the HS. As described herein, referencing FIG. 2, mapping logic 250 is provided within the GP and directory 300 of each QBB node that provides the necessary mapping relation needed to ensure proper routing over the HS 400.

In the illustrative embodiment, the logic circuits of each QBB node are preferably implemented as application specific integrated circuits (ASICs). For example, the local switch 210 comprises a quad switch address (QSA) ASIC and a plurality of quad switch data (QSD0-3) ASICs. The QSA receives command/address information (requests) from the processors, the GP and the IOP, and returns command/address information (control) to the processors and GP via 14-bit, unidirectional links 202. The QSD, on the other hand, transmits and receives data to and from the processors, the IOP and the memory modules via 72-bit, bi-directional links 204.

Each memory module includes a memory interface logic circuit comprising a memory port address (MPA) ASIC and a plurality of memory port data (MPD) ASICs. The ASICs are coupled to a plurality of arrays that preferably comprise synchronous dynamic random access memory (SDRAM) dual in-line memory modules (DIMMs). Specifically, each array comprises a group of four SDRAM DIMMs that are accessed by an independent set of interconnects. That is, there is a set of address and data lines that couple each array with the memory interface logic.

The IOP preferably comprises an I/O address (IOA) ASIC and a plurality of I/O data (IOD0-1) ASICs that collectively provide an I/O port interface from the I/O subsystem to the QBB node. Specifically, the IOP is connected to a plurality of local I/O risers (not shown) via I/O port connections 215, while the IOA is connected to an IOP controller of the QSA and the IODs are coupled to an IOP interface circuit of the QSD. In addition, the GP comprises a GP address (GPA) ASIC and a plurality of GP data (GPD0-1) ASICs. The GP is coupled to the QSD via unidirectional, clock forwarded GP links 206. The GP is further coupled to the HS via a set of unidirectional, clock forwarded address and data HS links 408.

A plurality of shared data structures are provided for capturing and maintaining status information corresponding to the states of data used by the nodes of the system. One of these structures is configured as a duplicate tag store (DTAG) that cooperates with the individual caches of the system to define the coherence protocol states of data in the QBB node. The other structure is configured as a directory (DIR 300) to administer the distributed shared memory environment including the other QBB nodes in the system. The protocol states of the DTAG and DIR are further managed by a coherency engine 220 of the QSA that interacts with these structures to maintain coherency of cache lines in the SMP system.

Although the DTAG and DIR store data for the entire system coherence protocol, the DTAG captures the state for the QBB node coherence protocol, while the DIR captures the coarse state for the SMP system protocol. That is, the DTAG functions as a "short-cut" mechanism for commands (such as probes) at a "home" QBB node, while also operating as a refinement mechanism for the coarse protocol state stored in the DIR at "target" nodes in the system. Each of these structures interfaces with the GP to provide coherent communication between the QBB nodes coupled to the HS.

The DTAG, DIR, coherency engine, IOP, GP and memory modules are interconnected by a logical bus, hereinafter referred to as an Arb bus 225. Memory and I/O reference operations issued by the processors are routed by an arbiter 230 of the QSA over the Arb bus 225. The coherency engine, purge adaptive logic, and arbiter are preferably implemented as a plurality of hardware registers and combinational logic configured to produce sequential logic circuits and cooperating state machines. It should be noted, however, that other configurations of the coherency engine, arbiter and shared data structures may be advantageously used herein.

Specifically, the DTAG is a coherency store comprising a plurality of entries, each of which stores a cache block state of a corresponding entry of a cache associated with each processor of the QBB node. Whereas the DTAG maintains data coherency based on states of cache blocks located on processors of the system, the DIR 300 maintains coherency based on the states of memory blocks located in the main memory of the system. Thus, for each block of data in memory, there is a corresponding entry (or "directory word") in the DIR that indicates the coherency status/state of that memory block in the system (e.g., where the memory block is located and the state of that memory block).

Cache coherency is a mechanism used to determine the location of a most current, up-to-date copy of a data item within the SMP system. Common cache coherency policies include a "snoop-based" policy and a directory-based cache coherency policy. A snoop-based policy typically utilizes a data structure, such as the DTAG, for comparing a reference issued over the Arb bus with every entry of a cache associated with each processor in the system. A directory-based coherency system, however, utilizes a data structure such as the DIR.

Since the DIR 300 comprises a directory word associated with each block of data in the memory, a disadvantage of the directory-based policy is that the size of the directory increases with the size of the memory. In the illustrative embodiment described herein, the modular SMP system has a total memory capacity of 256 GB of memory; this translates to each QBB node having a maximum memory capacity of 32 GB. For such a system, the DIR requires 500M entries to accommodate the memory associated with each QBB node. Yet the cache associated with each processor comprises 4 MB of cache memory which translates to 64K cache entries per processor or 256K entries per QBB node.

Figure 3:
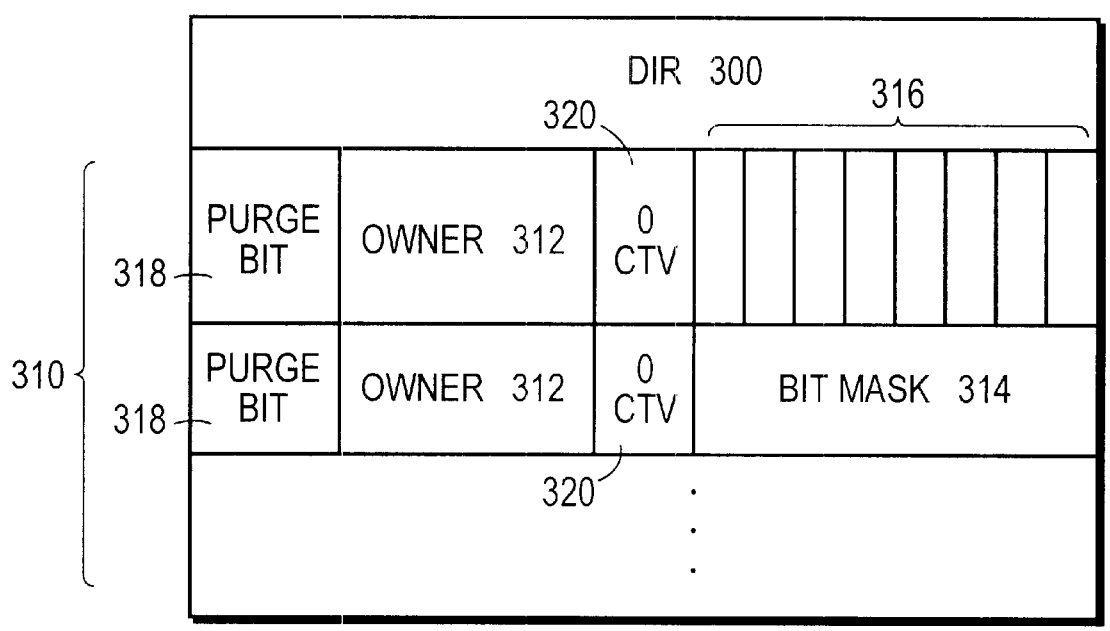
FIG. 3 is a schematic block diagram of the organization of the DIR.

Thus it is apparent from a storage perspective that a DTAG-based coherency policy is more efficient than a DIR-based policy. However, the snooping foundation of the DTAG policy is not efficiently implemented in a modular system having a plurality of QBB nodes interconnected by an HS. Therefore, in the illustrative embodiment described herein, the cache coherency policy preferably assumes an abbreviated DIR approach that employs distributed DTAGs as short-cut and refinement mechanisms FIG. 3 is a schematic block diagram of the organization of the DIR 300 having a plurality of entries 310, each including an owner field 312, a bit-mask field 314, a purge bit 318, and a D counter field 320. The owner field 312 identifies the agent (e.g., processor, IOP or memory) having the most current version of a data item in the SMP system. The purge bit field 318 indicates that a data item has been purged to memory without a subsequent occurrence of a read request or a read-modify request or a victim command. The D counter field 320 is used to adaptively determine if a data item is a possible condidate for purging. The bit-mask field 314 has a plurality of bits 316, each corresponding to a QBB of the system. When asserted, the bit 316 indicates that its corresponding QBB has a copy of the data item. Each time a 64-byte block of data is retrieved from the memory, the DIR provides a directory word (i.e., the directory entry corresponding to the address of the data block) to the coherency engine 220. The location of the data block in memory and the location of the directory entry 310 in the directory are indexed by the address of the request issued over the Arb bus 225 in accordance with a full, direct address look-up operation.

For example, if a processor issues a write request over the Arb bus 225 to overwrite a particular data item, a look-up operation is performed in the DIR based on the address of the request. The appropriate directory entry 310 in the DIR may indicate that certain QBB nodes have copies of the data item. The directory entry/word is provided to a coherency engine 240 of the GPA, which generates a probe command (e.g., an invalidate probe) to invalidate the data item. The probe is replicated and forwarded to each QBB having a copy of the data item. When the invalidate probe arrives at the Arb bus associated with each QBB node, it is forwarded to the DTAG where a subsequent look-up operation is performed with respect to the address of the probe. The look-up operation is performed to determine which processors of the QBB node should receive a copy of the invalidate probe.

Figure 4:
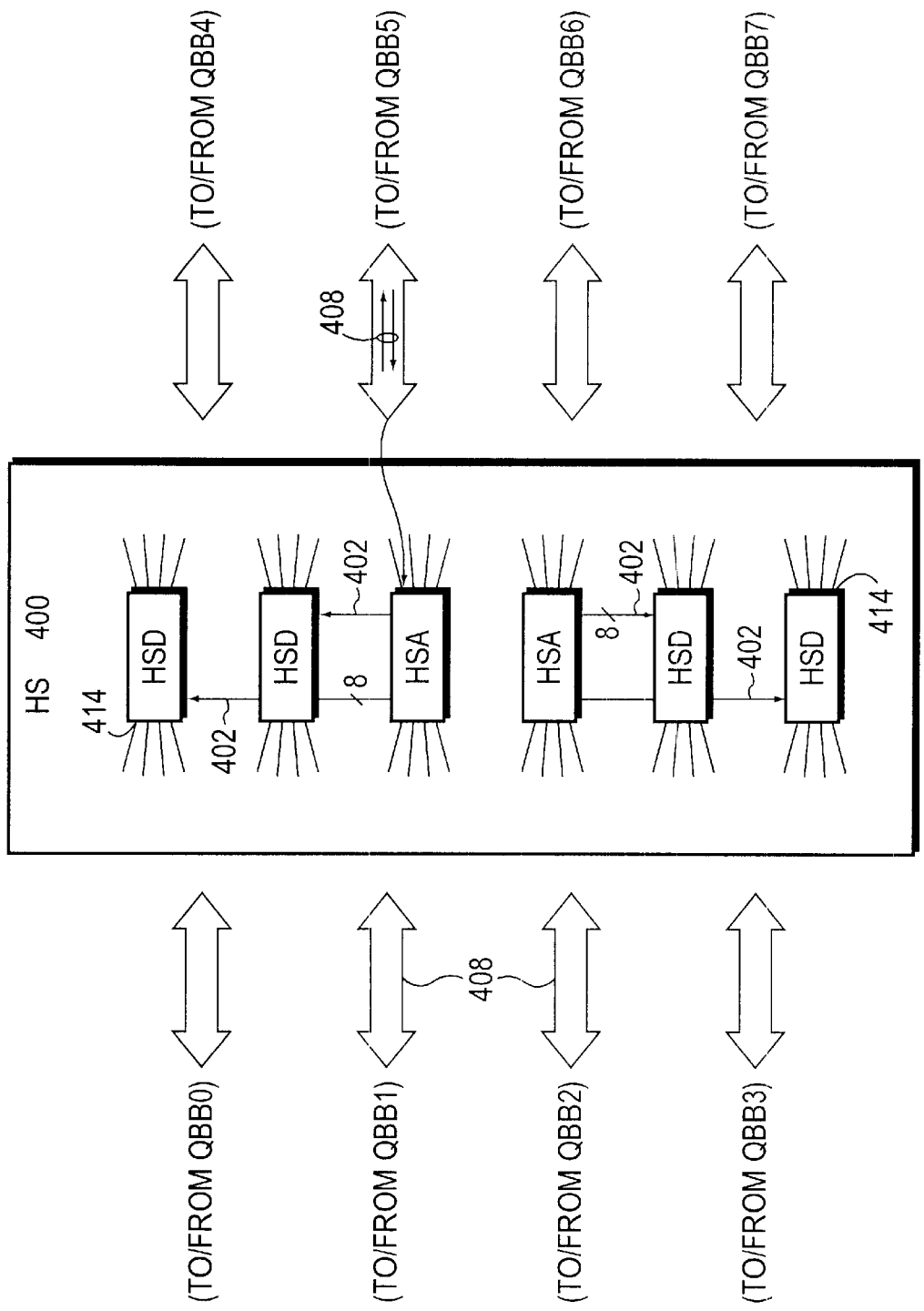
FIG. 4 is a schematic block diagram of the HS of FIG. 1.

FIG. 4 is a schematic block diagram of the HS 400 comprising a plurality of HS address (HSA) ASICs and HS data (HSD) ASICs. In the illustrative embodiment, each HSA controls two (2) HSDs in accordance with a master/slave relationship by issuing commands over lines 402 that instruct the HSDs to perform certain functions. Each HSA and HSD includes eight (8) ports 414, each accommodating a pair of unidirectional interconnects; collectively, these interconnects comprise the HS links 408. There are sixteen command/address paths in/out of each HSA, along with sixteen data paths in/out of each HSD. However, there are only sixteen data paths in/out of the entire HS; therefore, each HSD preferably provides a bit-sliced portion of that entire data path and the HSDs operate in unison to transmit/receive data through the switch. To that end, the lines 402 transport eight (8) sets of command pairs, wherein each set comprises a command directed to four (4) output operations from the HS and a command directed to four (4) input operations to the HS.

Figure 5:
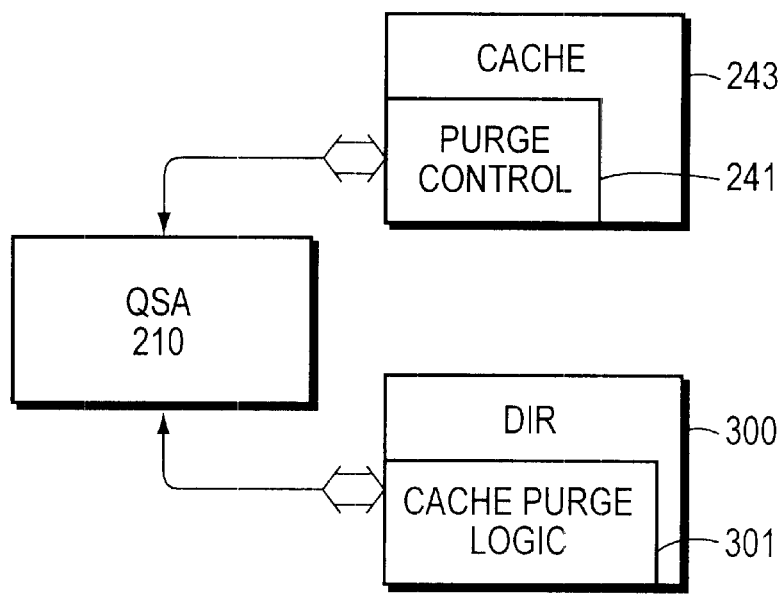
FIG. 5 is a block diagram of an embodiment of the present invention.

FIG. 5 is a block diagram showing the cache purge control 241 packaged with the cache itself 243 and that 301 packaged with the directory 300.

Figure 6:
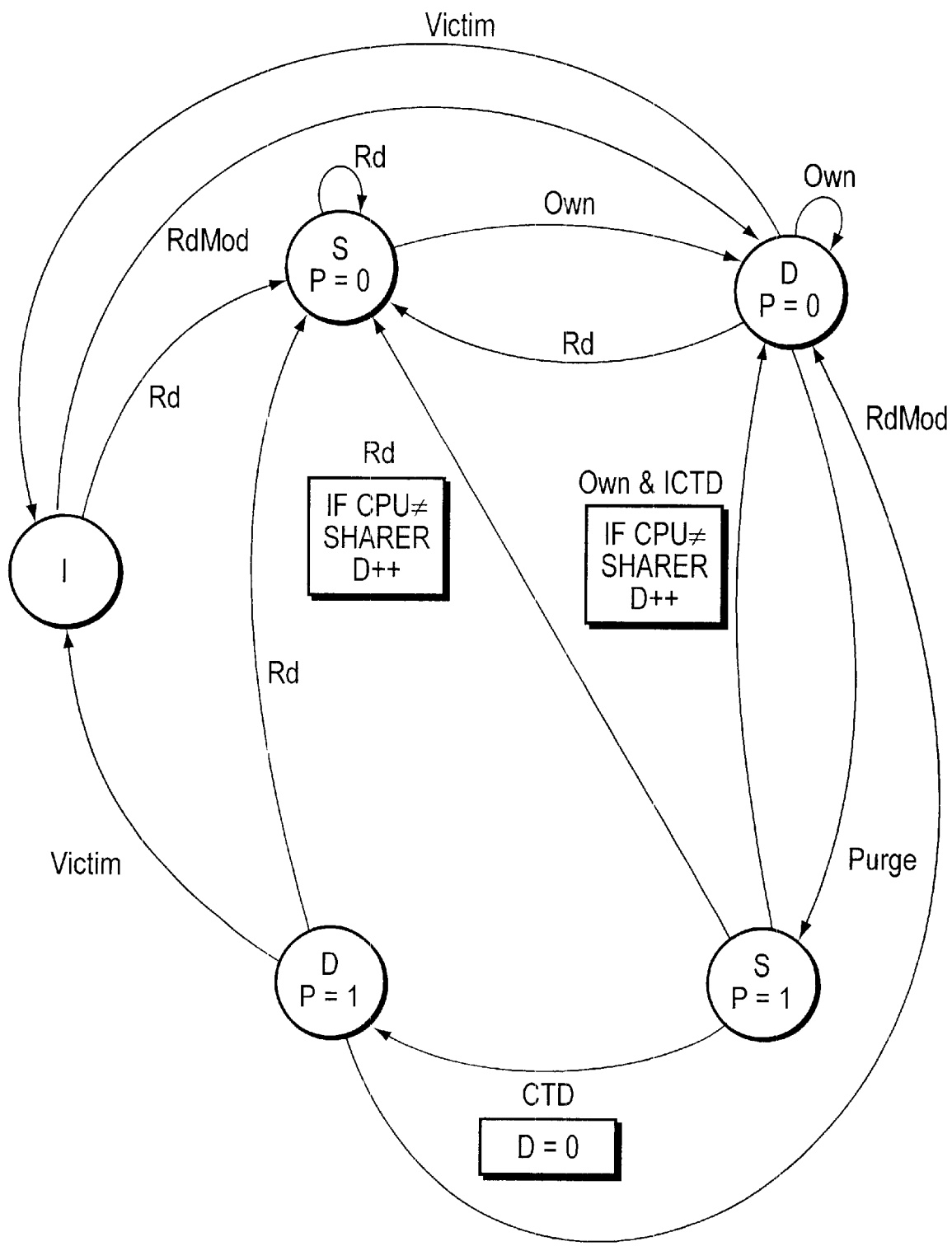
FIGS. 6 and 7 are state diagrams of designs made in accordance with the present invention.
Figure 7:
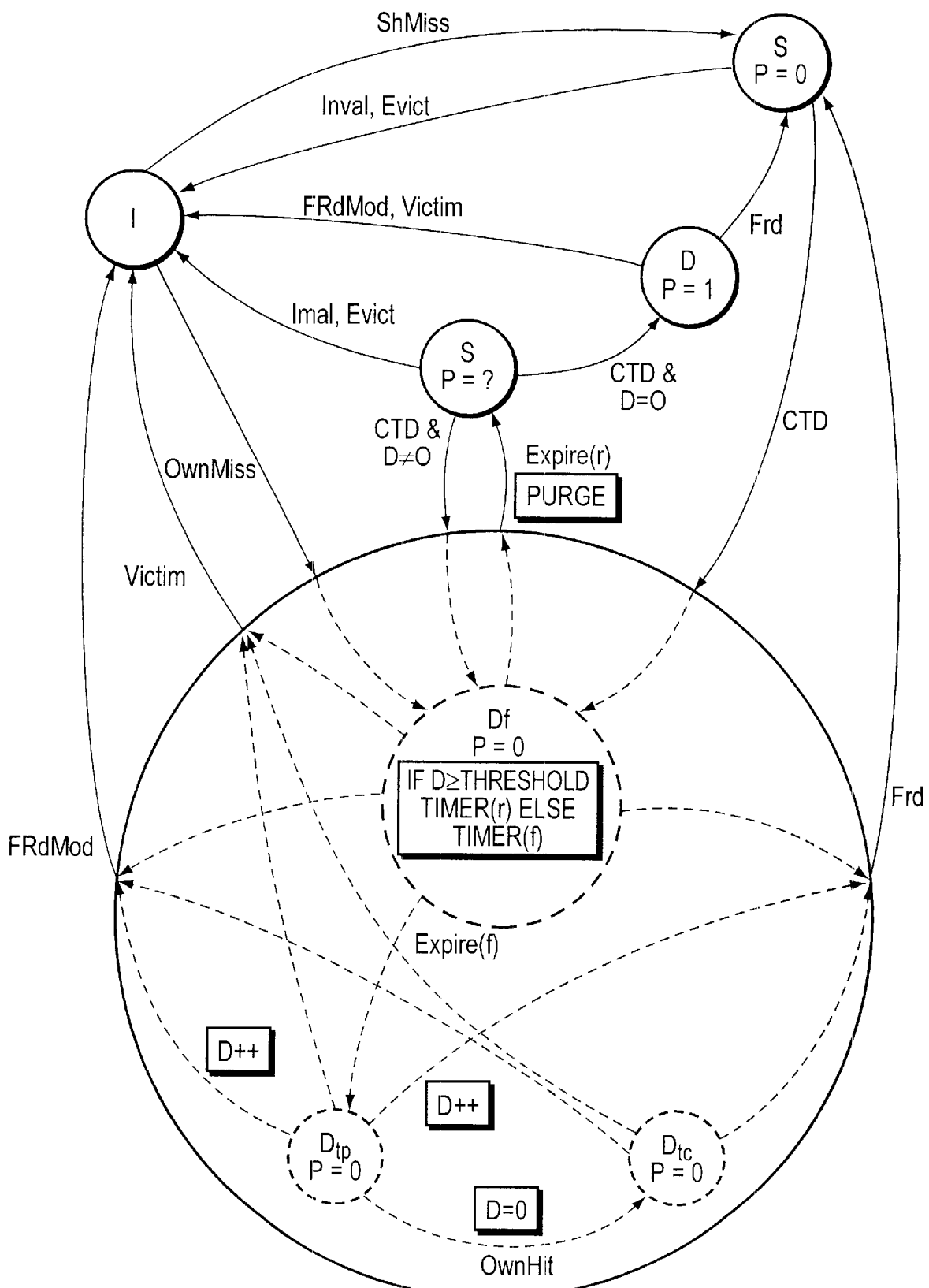

A cache data line becomes a candidate for purging when so determined by the state machine, discussed below. The purge control 241 (which includes the delay timer), resident at the cache memory itself 243, will receive that information and after the time delay, as discussed below, expires will cause the cache data line to be purged to memory. Implementation of the logic state machines and any such a delay timer, see FIGS. 6 and 7 are well known in the art and such can be implemented with software and/or firmware or hardware or combinations thereof. In addition, as is known in the art, there may be levels of cache built into the large systems, where the levels are determined on priorities or other criteria. In this case the present invention may be used to evict cache data from one level of cache to another lower level.

The general operation of the adaptive purge control system is to reduce the remote cache misses by selectively purging exclusive cache data lines in order to break the ownership-miss-remote-miss chain of events that typically adversely affects the SMP system performance. An ownership miss is a miss that requests exclusive access to a cache block. This can be a change-to-dirty write miss or a read-exclusive miss. Remote misses are misses on addresses for which the home of the data is in a remote memory. The protocol purges the cache sometime after the cache acquired ownership of the data. When the purge occurs the data is restored to memory, making the shared memory the owner. As described below the adaptive algorithm respectively rewards or penalizes itself by identifying purge decisions that improve and degrade system performance. In a preferred embodiment and as mentioned above, the system parameter that is considered as "improved" or "degraded" is the latency of or the time it takes for a processor finding and loading data into its local cache.

The state machine diagram of FIG. 6 illustrates a preferred embodiment state machine diagram of a purge controller at the directory. Note that the referenced numbers are those of FIGS. 3 and 5. The diagram introduces five states that a purge controller at a directory finds a DIR entry 310 (FIG. 5) of a cache line to be in:

The DIR entry of a cache line is in the "Invalid" state, denoted by "I" in the diagram, when the owner field 312 (FIG. 3) indicates memory is the owner and the bit-mask field 314 has all of its bits 316 (FIG. 3) cleared.

The DIR entry of a cache line is in the "Shared-non-purged" state, denoted by "S, P=0" in the diagram, when the owner field 312 indicates memory is the owner, the bit-mask field 314 (FIG. 3) has at least one of its bits 316 (FIG. 3) asserted, and the purge bit field 318 (FIG. 3) is cleared.

The DIR entry of a cache line is in the "Shared-purged" state, denoted by "S, P=1" in the diagram, when the owner field 312 (FIG. 3) indicates memory is the owner, the bit-mask field 314 (FIG. 3) has at least one of its bits 316 (FIG. 3) asserted, and the purge bit field 318 (FIG. 3) is asserted.

The DIR entry of a cache line is in the "Dirty-non-purged" state, denoted by "D, P=0" in the diagram, when the owner field 312 indicates that an agent is the owner, the bit-mask field 314 has at least one of its bits 316 asserted, and the purge bit field 318 is cleared.

The DIR entry of a cache line is in the "Dirty-purged" state, denoted by "D, P=1" in the diagram, when the owner field 312 indicates an agent is the owner, the bit-mask field 314 has at least one of its bits 316 asserted, and the purge bit field 318 is asserted.

These states are examined by the purge control logic 301 (FIG. 5) at a directory, in order to adaptively mark a cache line as a candidate for purging.

Consider the state of the DIR entry of a cache line is "Invalid", hence no cache has currently a copy of the line and memory is the owner. If an agent requests a copy of the cache line, then a Rd request is issued to the system and the DIR entry corresponding to that cache line enters the "Shared-non-purged". Subsequent Rd requests by the same or other agents do not change the state of the DIR entry of that cache line. If an agent issues an ownership miss then the DIR entry of that cache line enters the "Dirty-not-purged" state. Subsequent ownership misses by the same or other agents do not change the state of the DIR entry of that cache line. Upon a purge of the cache line to shared memory, the state of the DIR entry becomes "Shared-purged". At this time there exists only one cached copy of that data in the system, and the DIR entry of that cache line will have only one bit set of the bits 316 comprising the bit-mask field 314. As used herein, the term "sole sharer of a cache line" refers to the agent that corresponds to the only asserted bit in the bit-mask field of the DIR entry for that particular cache line.

If the next operation is a Rd request, the state of the DIR entry of that cache line will become "Shared-non-purged." If the Rd request is issued by the sole sharer, then the purge operation resulted neither in performance improvement nor in performance degradation. However, there is a system performance improvement if the Rd request is issued by an agent other than the sole sharer of that cache line. This represents a performance improvement since the missing agent only performs a two hop sequence to acquire the data in its cache. It first misses finding the data in its cache, issues a Rd request to the system (one hop) and loads the data from memory via a Fill response (another single hop). Had the purge not happened, the missing agent would have to access the sole sharer's cache. That would entail a Rd request issued to the system, a Frd probe issued by the system to the sole sharer, and a Fill response which carries the requested data (three hops). Similarly, if the next operation is a RdMod request, the state of the DIR entry of that cache line will become "Dirty-non-purged." If the RdMod request is issued by the sole sharer, then the purge operation resulted neither in performance improvement nor in performance degradation. However, if the RdMod request is issued by an agent other than the sole sharer of that cache line, it will only perform a two hop sequence to acquire the data in its cache (a RdMod request followed by a FillMod response). Had the purge not happened, the missing agent would have to perform a three hop sequence to acquire the data in its cache (a RdMod request followed by a FrdMod issued to the sole sharer, followed by a FillMod response).

On the other hand, the system performance is degraded if the next event on the cache line is the sole sharer attempting to subsequently update the data and finds it has been purged. This might be referred to as a spurious purge since the sole sharer has to reacquire the ownership of the data with a CTD request.

In the case where system performance is improved by purging, a counter, D, is incremented which will make purging more probable, and in the case where the system performance is degraded the D counter is reset, making purging less probable. In other preferred embodiments other counting schemes may be used.

If the state of the DIR entry of the cache line is "Dirty-purged" and the next event on the cache line is a Rd request, then the state of the DIR entry of that cache line becomes "Shared-non-purged." If the next event is a RdMod request, then the state of the DIR entry of that cache line becomes "Dirty-non-purged." Finally, if the next event is a Victim command, then the state of the DIR entry of that cache line becomes "Invalid." If the state of the DIR entry of the cache line is "Invalid" and the next event is a RdMod request, then the state of the DIR entry of that cache line becomes "Dirty-non-purged." Then, if the next event on the cache line is a Rd request, then the state of the DIR entry of that cache line becomes "Shared-non-purged." If instead the next event on the cache line is a Victim command, then the state of the DIR entry of that cache line becomes "Invalid."

The state machine diagram of FIG. 7 illustrates a preferred embodiment state machine diagram of a purge controller at a cache. The diagram introduces five states that a cache line can be in, which are similar to the corresponding DIR entry:

"Invalid", denoted by "I", indicating that the cache does not have a valid copy of the data.

"Shared-non-purged", denoted by "S, P=0", indicating that the cache has a read-only copy of the data and the line has not been purged.

"Shared-purged", denoted by "S, P=?", indicating that the cache is the sole sharer of the data which are stored in a read-only copy and the line has been purged.

"Dirty-purged", denoted by "D, P=1", indicating that the cache is the owner of the data, which has also been purged.

"Dirty-non-purged", indicating that the cache is the owner of the data, which has not been purged. This state is actually comprised of three sub-states from the point of view of the cache:

"Dirty-timer", denoted by "$D_t$, P=0", indicating that the cache is the owner of the data, the line has not been purged, and neither the real nor the training (also mentioned as "fake") delay timer has expired.

"Dirty-timer-purged", denoted by "$D_{tp}$, P=0", indicating that the cache is the owner of the data, it has not been purged, and the training delay timer has expired.

"Dirty-timer-CTD", denoted by "$D_{tc}$, P=0", indicating that the cache is the owner of the data, it has not been purged, the training delay timer has expired, and a subsequent write hit has occurred.

These states are examined by the cache purge controllers 231 and 241, in order to adaptively mark a cache line as a candidate for purging.

Consider a cache line that is in "Invalid" state, hence the cache does not hold a valid copy. If the cache-subsequently attempts to update the data, it performs an ownership miss, issues a RdMod request to the system, and upon arrival of a FillMod response it enters the "Dirty-non-purged" state and more specifically the "Dirty-timer" sub-state. The value of the D counter is compared to a threshold. If the D counter reaches or exceeds the threshold, the cache line is tagged or marked as a candidate for purging and a real delay timer starts (denoted by timer(r) in the diagram), otherwise a training delay timer starts (denoted by timer(t) in the diagram). The training delay timer is also called "fake" delay timer, from the point of view that a time out will not really purge the cache line in question. However, it is useful for the system in order to adapt its purging decision based on the system operations.

If the next local event is the expiration of the training delay timer, the cache line enters the "Dirty-timer-purge" state. This indicates that, had the expired timer been a real one, the cache line in question would have been purged. When the time out of the training timer occurs, a watchdog is installed and monitors the cache line for write hits. If a write hit occurs, then a CTD would have occurred if the line had been purged, which would have degraded the system performance. However, if a Frd probe arrives after the training timer expiration but before a write hit occurs, an actual purging would have replaced a three hop miss by a two hop miss, therefore enhancing the system performance. In this case the cache line enters the "Shared-non-purged" state. Similarly, if a FRdMod probe arrives after the training timer expiration but before a write hit occurs, an actual purging would have again replaced a three hop miss by a two hop miss, therefore enhancing the system performance. In this case the cache line enters the "Invalid" state since the remotely requesting agent will become the new owner of the cache line. Finally, a Victim command would have neither enhanced nor degraded system performance if the line had been purged. In such a case, the new state of the cache line would be "Invalid."

If the state of the cache line is "Dirty-timer" and the next local event is the expiration of the real delay timer, then the cache purges the line back to memory along with a "Purge" command, and it enters the "Shared-purged" state. If the next local event is a CTD and the D counter is set to zero, this designates that the directory has cleared the D counter because it detected a performance degradation event. So a CTD request is sent to the system, and the cache line enters the "Dirty-purged" state, and no timer starts since the cache line ceased to be a candidate for purging. If, however, the value of the D counter is non-zero, this designates that the purge operation succeeded in improving system performance, and hence the cache line enters the "Dirty-timer" state and a real delay timer starts anew. Finally, if the next local event after the "Shared-purged" state is not a CTD but an Invalidate probe or an Evict command, then the cache line enters the "Invalid" state.

If the state of the cache line is "Dirty-purged" and the next local event is a Frd probe, the cache line enters the "Shared-non-purged" state. If instead it is a FrdMod probe or a Victim command, it enters the "Invalid" state.

If the state of the line is "Shared-non-purged" and the next local event is an Invalidate probe or an Evict command, the cache line state becomes "Invalid." If instead the next local event is a CTD, the cache line enters the "Dirty-timer" state and a corresponding delay timer starts anew. If the state of the cache line is "Invalid" and the next local event is a Rd miss, the cache line enters the "Shared-non-purged" state.

If the state of the cache line is "Dirty-non-purged" and the next local event is the arrival of a Frd probe, then the state of the cache line will become "Shared-non-purged." If the next local event is instead a FRdMod probe or a Victim command, then the state of the cache line will become "Invalid." Upon arrival of an external probe or a Victim command while in the "Dirty-timer" state, the delay timer for that cache line stops.

Similar to the purge controller at the directory, in the case where system performance would improve by purging, the D counter is incremented which will make purging more probable, and in the case where the system performance would degrade, the D counter is reset, reducing the chances of a purge. In a preferred embodiment, the D counter is a two-bit counter and the threshold is set to two. However, other threshold values may be found and used advantageously. Moreover, other preferred embodiment may use multiple D counters each associated with an agent, the thresholds may be arranged per agent where cache lines are designated for purging differently for each one.

In the embodiment the value of the D counter is stored in the directory, and is communicated between the directory and the caches or between caches. It is passed by the directory to the cache as a part of the response to an ownership miss, hence a FillMod response or a CTD-success response. It is communicated by a cache to the directory as a part of a Victim command, a Purge command, or a Memory-update command which is part of the response to a Frd probe. Finally, it is communicated by a cache to another cache as part of a FillRdMod response triggered by a FRdMod probe.

As has been shown, the purge controller at the directory and the purge controller at each cache work as a team to adaptively identify cache lines to be purged. The line is always monitored and will adaptively decide on each ownership miss if the line is to be subsequently purged.

In yet another example, the delay of the fake and the purge delay timer is an algorithm of hardware and/or software to count local misses. But other preferred embodiment may include counting instructions or clock cycles.

In yet other embodiments, the cache may be partitioned into cache lines where a single cache line may be adaptively purged as discussed above, but clusters of cache lines may be adaptively purged, where the clustering may be implemented considering some common characteristics of the cache lines.

Figure 8:
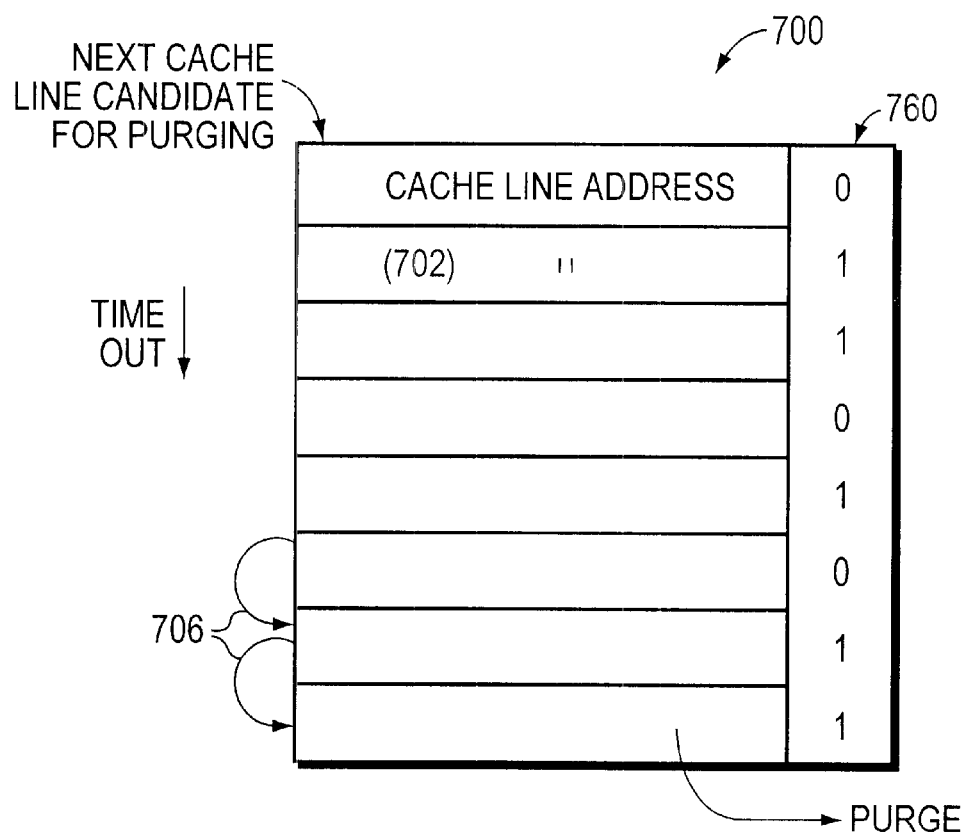
FIG. 8 is a FIFO chart made in accordance with the present invention.

In an example, as shown in FIG. 8, when the contents of the D counter are compared to the threshold for a cache line (or lines), if the threshold is exceeded, the cache line candidates may be stored 704 in a first-in first-out (FIFO)

stack 700 by cache line address 702. Another bit may tag 710 associated with each address indicated if the address is a candidate for actual purging if the threshold was exceeded, or a fake purge time out has occurred. In each case the FIFO is stepped along in time by local and remote misses, and when a particular address emerges from the FIFO that cache line is purged if the tag bit so indicates or not if the fake purge is running.

Victims and external probes check the entries in the FIFO, and if the address of an entry matches, it is rendered invalid. This is the logical equivalent of stopping the timer, since when the entry emerges out of the FIFO, it will not correspond to any cache line. This is performed because a match indicates that, while the real or fake timer runs, the cache line must abandon its exclusive state in the local cache, and hence a purge would be meaningless. Additionally, if the entry is left in the FIFO, the cache line may re-enter the "dirty-timer" state before the FIFO entry emerges out of the FIFO. When it finally emerges out of the FIFO, it may cause a very early purge or very early transition to "Dirty-timer-purged" state, depending on the tag bit. The early purge may cause system performance degradation by causing additional CTD requests. The very early transition to "Dirty-timer-Purged" state may erroneously train the protocol for this cache line. By rendering the cache line entry in the FIFO invalid, the consequences mentioned above are avoided. This may be done by changing the address of the entry to an invalid one upon victims and probes.

What is claimed is:

1. A method for adaptively determining cache data candidates for purging, wherein physical cache memory is associated with a local component of a local node in a modular multiprocessor system having a of plurality interconnected processors, I/O ports, and memory, the method comprising the steps of:

determining system performance enhancing and degrading events occurring with respect to purging cache data, first tracking performance enhancing events on the cache data, second tracking performance degrading events on the cache data, assessing the impact on system performance by the first and second trackings, and in response thereto, if performance would be enhanced, designating the cache data for purging.

2. The method as defined in claim 1 wherein the step of determining system enhancing and degrading events includes the steps of: recognizing that:

some read-dirties and certain references by remote processors after a purge are enhancing event, and that some writes to the data by the local processor that owns the data and some writes after the data has been purged are performance degrading events.

3. The method as defined in claim 1 further comprising the steps of counting the number of performance enhancing and degrading events.

4. The method as defined in claim 3 further comprising the steps of:

formulating a threshold, forming a difference between the numbers of performance enhancing and degrading events, comparing the difference to the threshold, and if the threshold is triggered, designating the cache data as a candidate for purging.

5. The method as defined in claim 3 further comprising the steps of:

setting the difference to zero whenever a degrading event occurs, and incrementing the count whenever an enhancing event occurs.

6. The method as defined in claim 4 further comprising the steps of:

after the threshold is triggered, starting a time out delay, wherein the time out delay must be completed before the cache data is purged.

7. The method as defined in claim 1 further comprising the step of evicting data from one cache level to a lower level wherein such eviction designates the cache data for purging.

8. The method as defined in claim 6, wherein the time out delay includes the step of counting miss events.

9. The method as defined in claim 6, wherein the time out includes the step of counting instructions executed.

10. The method as defined in claim 6, wherein the time out delay includes the step of counting clock cycles.

11. The method as defined in claim 4, wherein if the threshold is not triggered, starting a fake time out delay, and, when the fake delay time out expires, if a write-hit occurs, resetting the count to zero; and if a read-dirty occurs, absent a write-hit, incrementing the count; but if before the fake delay has expired, if a read-dirty or victim occurs, stopping the fake time out.

12. A system for adaptively determining cache data candidates for purging, wherein physical cache memory is associated with a local component of a local node in a modular multiprocessor system having a plurality of interconnected processors, I/O ports, and memory, the system comprising:

means for determining system performance enhancing and degrading events occurring with respect to purging cache data, logic for first tracking performance enhancing events on the cache data, logic for second tracking performance degrading events on the cache data, means for assessing the impact on system performance by the first and second trackings, and in response thereto, if performance would be enhanced, means for designating the cache data for purging.

13. The system as defined in claim 12 wherein the means for determining system enhancing and degrading events includes: means for recognizing that:

some read-dirties and certain references by remote processors after a purge are enhancing event, and that some writes to the data by the local processor that owns the data and some writes after the data has been purged are performance degrading events.

14. The system as defined in claim 12 further comprising logic for counting the number of performance enhancing and degrading events.

15. The system as defined in claim 14 further comprising:

means for formulating a threshold, logic for forming a difference between the numbers of performance enhancing and degrading events, and a comparator for comparing the difference to the threshold, and if the threshold is triggered, and means for designating the cache data as a candidate for purging.

16. The system as defined in claim 14 further comprising:

means for setting the difference to zero whenever a degrading event occurs, and means for incrementing the count whenever an enhancing event occurs.

17. The method as defined in claim 15 further comprising:

after the threshold is triggered, means for starting a time out delay, wherein the time out delay must be completed before the cache data is purged.

18. The system as defined in claim 12 further comprising means for evicting data from one cache level to a lower level wherein such eviction designates the cache data for purging.

19. The system as defined in claim 17, wherein the time out delay includes the means for counting miss events.

20. The system as defined in claim 17, wherein the time out includes means for counting instructions executed.

21. The system as defined in claim 17, wherein the time out delay includes means for counting clock cycles.

22. The system as defined in claim 15 further comprising, wherein if the threshold is not triggered, means for starting a fake time out delay, and, when the fake delay time out expires, if a write-hit occurs, means for resetting the count to zero; and if a read-dirty occurs, absent a write-hit, means for incrementing the count; but if before the fake delay has expired, if a read-dirty or victim occurs, means for stopping the fake time out.

* * * * *